(12) United States Patent
Stamm et al.

(10) Patent No.: US 7,187,382 B2
(45) Date of Patent: Mar. 6, 2007

(54) ITERATIVELY SOLVING CONSTRAINTS IN A FONT-HINTING LANGUAGE

(75) Inventors: Beat Stamm, Redmond, WA (US); Gregory C. Hitchcock, Woodinville, WA (US); Michael J. Duggan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 149 days.

(21) Appl. No.: 10/764,961

(22) Filed: Jan. 26, 2004

(65) Prior Publication Data
US 2005/0162429 A1    Jul. 28, 2005

(51) Int. Cl.
*G06T 11/00* (2006.01)
*G09G 5/24* (2006.01)
*G09G 5/26* (2006.01)

(52) U.S. Cl. .................. 345/467; 345/470; 345/471
(58) Field of Classification Search ...... 345/467–472.3
See application file for complete search history.

(56) References Cited

U.S. PATENT DOCUMENTS

| | | | | |
|---|---|---|---|---|
| 4,387,622 A * | 6/1983 | Deutsch | ....................... | 84/607 |
| 4,696,707 A | 9/1987 | Lewis et al. | ................... | 156/64 |
| 4,884,225 A | 11/1989 | Fogarty et al. | ............. | 364/559 |
| 5,155,805 A | 10/1992 | Kaasila | ....................... | 395/151 |
| 5,159,668 A | 10/1992 | Kaasila | ....................... | 395/151 |
| 5,319,358 A | 6/1994 | Martinez et al. | ............ | 345/141 |
| 5,325,479 A | 6/1994 | Kaasila | ....................... | 395/151 |
| 5,412,770 A * | 5/1995 | Yamashita et al. | .......... | 345/442 |
| 5,465,323 A * | 11/1995 | Mallet | ......................... | 345/423 |
| 5,500,927 A | 3/1996 | Sander-Cederlof et al. | . | 395/133 |
| 5,539,841 A | 7/1996 | Huttenlocher et al. | ...... | 382/218 |
| 5,586,241 A | 12/1996 | Bauermeister et al. | ...... | 395/167 |
| 5,684,510 A | 11/1997 | Brassell et al. | ............. | 345/143 |
| 5,715,473 A | 2/1998 | Reed | ........................... | 395/805 |
| 5,751,289 A | 5/1998 | Myers | ......................... | 345/419 |
| 5,754,873 A | 5/1998 | Nolan | ......................... | 395/789 |
| 5,760,787 A | 6/1998 | Piper | .......................... | 345/442 |
| 5,777,627 A | 7/1998 | Takazawa | ................... | 345/469 |
| 5,781,714 A * | 7/1998 | Collins et al. | .............. | 345/471 |

(Continued)

FOREIGN PATENT DOCUMENTS

WO     WO 9836630 A2 *    8/1998

OTHER PUBLICATIONS

Eric W. Weisstein. "Taylor Series." From MathWorld—A Wolfram Web Resource. 1999.*

(Continued)

*Primary Examiner*—Ulka Chauhan
*Assistant Examiner*—Eric Woods
(74) *Attorney, Agent, or Firm*—Workman Nydegger (57) ABSTRACT

The principles of the present invention relate to iteratively solving constraints in a font-hinting language. A computing system accesses a more complex constraint that can not be natively expressed based on the vocabulary of the font-hinting language, the more complex constraint constraining at least a portion of the outline. The computing system decomposes the more complex constraint into a plurality of simpler constraints that can be natively expressed based on the vocabulary of the font-hinting language. The computer system represents each of the simpler constraints in corresponding font-hinting language instructions that can be iteratively processed to at least approximate a solution to the more complex constraint. The font-hinting language instructions are iteratively processed at the computing system or another computing system to cause a graphical object to comply, within a specific tolerance, with the more complex constraint.

18 Claims, 3 Drawing Sheets

U.S. PATENT DOCUMENTS

| | | | | |
|---|---|---|---|---|
| 5,805,832 | A * | 9/1998 | Brown et al. | 711/1 |
| 5,854,855 | A | 12/1998 | Errico et al. | 382/187 |
| 5,898,439 | A | 4/1999 | Takazawa | 345/441 |
| 5,949,435 | A | 9/1999 | Brock et al. | 345/468 |
| 6,037,949 | A | 3/2000 | DeRose et al. | 345/430 |
| 6,048,116 | A | 4/2000 | Kumada | 400/76 |
| 6,088,041 | A * | 7/2000 | Ballard et al. | 345/467 |
| 6,249,908 | B1 * | 6/2001 | Stamm | 717/113 |
| 6,253,374 | B1 * | 6/2001 | Dresevic et al. | 717/126 |
| 6,289,488 | B1 * | 9/2001 | Dave et al. | 716/1 |
| 6,300,960 | B1 | 10/2001 | DeRose et al. | 345/474 |
| 6,363,405 | B1 * | 3/2002 | Loginov | 708/270 |
| 6,373,489 | B1 | 4/2002 | Lu et al. | 345/428 |
| 6,441,846 | B1 | 8/2002 | Carlbon et al. | 348/169 |
| 6,452,597 | B1 | 9/2002 | Goldberg et al. | 345/472 |
| 6,456,305 | B1 | 9/2002 | Qureshi et al. | 345/800 |
| 6,529,197 | B1 * | 3/2003 | Ballard et al. | 345/468 |
| 6,600,485 | B1 * | 7/2003 | Yoshida et al. | 345/419 |
| 6,600,490 | B1 | 7/2003 | Brock et al. | 345/472 |
| 6,714,679 | B1 | 3/2004 | Scola et al. | 382/199 |
| 6,760,028 | B1 * | 7/2004 | Salesin et al. | 345/469 |
| 6,778,698 | B1 | 8/2004 | Prakash et al. | 382/164 |
| 6,803,913 | B1 | 10/2004 | Fushiki et al. | 345/467 |
| 6,826,480 | B2 | 11/2004 | Picone et al. | 702/3 |
| 6,992,671 | B1 | 1/2006 | Corona | 345/467 |
| 2001/0002131 | A1 | 5/2001 | DeRose et al. | 345/423 |
| 2001/0032029 | A1 | 10/2001 | Kauffman | 700/99 |
| 2001/0048764 | A1 | 12/2001 | Betrisey et al. | |
| 2003/0208473 | A1 * | 11/2003 | Lennon | 707/3 |
| 2004/0109592 | A1 | 6/2004 | Bankman et al. | 382/128 |
| 2004/0160444 | A1 | 8/2004 | Salesin et al. | 345/471 |
| 2005/0005261 | A1 * | 1/2005 | Severin | 717/108 |
| 2005/0100214 | A1 | 5/2005 | Zhang et al. | 382/179 |

OTHER PUBLICATIONS

Human Vision and Electronic Imaging V / Resolution and Bit Depth: How Much is Enough? Bernice E. Rogowitz, Thrasyvoulos N. Pappas Jan. 2000 p. 28-36.

Computer Graphics Forum / Extraction of Typographic Elements From Outline Representations of Fonts Ariel Shamir and Ari Rappoport 1996.

U.S. Appl. No. 10/764,745, filed Jan. 26, 2004, Beat Stamm et al.

U.S. Appl. No. 10/764,787, filed Jan. 26, 2004, Beat Stamm et al.

U.S. Appl. No. 10/764,622, filed Jan. 26, 2004, Beat Stamm et al.

Riccardo Di Federico, Mario Raffin, Paola Carrai, Giovanni Ramponi. *Image Processing: Algorithms and Systems II Interpolation of Images Containing Text For Digital Displays*, Proceedings of Electronic Imaging Science and Technology, 2003, pp. 42-53.

Garcia, Dan. *Discussion Section 3 Scan Conversion Distillations*. Published approximately Spring-Fall 1998, pp. 1-2.

Foley, James et al. *Computer Graphics: Principles and Practice*. $2^{nd}$ Edition in C. Addison-Wesley Publishing Company, New York, 1996. various pages.

*Designing Multiple Master Typefaces*. Adobe Systems Incorporated. 1995, 1997.

*Type 1 Font Format Supplement*. Adobe Developer Support, Technical Specification #5015. Adobe Systems Incorporated, May 15, 1994.

* cited by examiner

ITERATIVELY SOLVING CONSTRAINTS IN A FONT-HINTING LANGUAGE

BACKGROUND OF THE INVENTION

1. The Field of the Invention

The present invention relates to a system and method for manipulating control data used to generate outlines of graphical objects. More specifically, the present invention relates to a system and method for iteratively solving constraints in a font-hinting language.

2. Background and Related Art

Computing technology has transformed the way we work and play. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems. As time moves forward, processing capability may be incorporated into a number of devices that traditionally did not have processing capability. Accordingly, the diversity of computing systems may likely increase.

Almost all computing systems that interface with human beings use a display to convey information. In many cases, the appeal of the display is considered an important attribute of the computing system. Historically, textual information (e.g., Latin-based characters) was displayed in cells of a Cathode Ray Tube ("CRT") display device. Each cell was divided into a grid of equally sized grid positions wherein each grid position could be turned on or off. For example, each cell of a CRT could be an 8×8 grid resulting in 64 possible grid positions per cell.

Each character of a character set was stored as a memory image (a bit-map) in the hardware of the CRT display device (e.g., in the video adapter). A memory image included a number of binary values (e.g., 64 binary values for displaying a character on an 8×8 grid), where each binary value corresponded to a specified grid position. One value (e.g., binary "1") represented that a corresponding grid position was to be "on" when the character was displayed and another value (e.g., a binary "0") represented that a corresponding grid position was to be "off" when the character was displayed. Upon receiving binary data (e.g., a bit-map) representing a character, the CRT would "turn on" grid positions corresponding to a binary 1 and would "turn off" grid positions corresponding to a binary 0 to display the character.

More recently, some computing systems have used proportional bit-maps (e.g., stored on disk) that vary in cell size depending on the character that is to be displayed. For example, in a proportional bit-map character set, the cell for the letter "i" could be more narrow (e.g., width of 3 grid positions) than the cell for the letter "h" (e.g., width of 6 grid positions).

However, storing characters as bit-maps (either fixed or proportional) can consume significant computing system resources. Since a computing system may need to display and print characters of a font (typically 256 or more different characters) at a variety of different sizes, storage of a significant number of different sized bit-maps may be required. For example, it may desirable to have a word processor display and print characters of a font in sizes ranging from 4 pt to 72 pt. Thus, a computing system running the word processor would potentially have to store 68 (72 minus 4) different sizes of bit-maps for displaying the font at different sizes.

Further, since printers typically have different (and for the most part higher) resolution than displays, the computing system would potentially also have to store a corresponding 68 (72 minus 4) different sizes of bit-maps for printing the font at different sizes. For example, a bitmap of an 8×5 grid (requiring 40 bits of storage) may be used to display a character at a specified size, while a bit-map of a 50×30 grid (requiring 1500 bits of storage) is used to print the character at the specified size.

The storage requirement problems associated with bit-map fonts is further compounded when a computing device is to display and print characters from different fonts. That is, the computing device may need to store bit-maps for representing a variety of different fonts at a variety of different sizes. Thus, in the above example, configuring the word processor to use 50 different fonts could result in well over 5,000 different sets of bit-maps (e.g., (68+68)*50). Since many character sets include 256 or more characters, this could easily result over 1 million individual bit-maps (e.g., 5,000*256). Storing bit-maps for underlined, bold, and/or italicized versions of each font can further increase the storage requirements. Further, producing a large number of bitmaps by hand is extremely time consuming.

Accordingly, even more recently, graphics primitives have been used to describe characters of a font. For example, a set of control points and instructions for connecting the points (e.g., connect with a straight line, an arc, a Bezier, etc.) can be used to define the outline of a character in an arbitrary grid space (e.g., an arbitrary grid space greater than the highest resolution of a pixelated device. Often, characters will be described at larger size and then mathematically scaled down (or otherwise manipulated) when the characters are to be rendered at smaller sizes (or as bold, italic, etc.). Thus, a reduced number of descriptions, and potentially only one description, for a character (per font) need be stored.

To scale a character down the location of control points can be divided by a scaling factor. For example, to scale a character down by a scaling factor of 10, the coordinates of each control point defining the character (at the higher resolution) can be divided by 10. It may be that control points defining a character for display on a 100×100 grid are to be scaled down for display on a 10×10 grid. Thus, a control point at grid position (50, 30) can be scaled down to a control point at grid position (5, 3), a control point at grid position (70, 70) can be scaled down to a control point at grid position (7, 7), etc. Accordingly, a smaller outline representing the character may be calculated and there is a reduced need for storing a number of different sizes of bit-maps for the character.

The smaller outline can then be analyzed to identify grid locations that are to be turned on and to identify grid locations that are to be turned off (a process often referred to as "scan conversion"). One scan conversion algorithm determines if the center of a grid position is inside or outside the smaller outline. When the center of a grid position is inside the smaller outline the grid position is turned on. On the other hand, when the center of a grid position is outside the smaller outline the grid position is turned off.

Also, when rendering a character, portions of the character may be required to ce conform to one or more constraints. A constraint can be expressed as algorithm defining one or more dependent parameters in terms of one or more independent parameters. Constraints for one control point can be expressed in terms of the location of other control points or locations on a grid (e.g., a capitalization line). For example, the position of a control point "P" can be expressed in terms of the position of a control point "Q" such that the P is a fixed distance "c" from Q. That is, P=Q+c. Thus, when Q is moved, a corresponding move of P may be required so that P conforms to the fixed distance c.

Due in part to the wide variety of different artistic and technical features in different fonts, constraints can be tailored to an individual font. Often, constraints are expressed in terms of a font-hinting language (e.g., the TrueType® language) having a limited and highly specific vocabulary. The limited and highly specific vocabulary simplifies the translation of the mathematical concepts into the font-hinting language. For example, it would typically be straight forward to translate the above mentioned constraint (P=Q+c), since font-hinting languages typically include an assignment operator (e.g., "=") and an addition operator (e.g., "+").

However, the limited and highly specific vocabulary can also limit the types of the constraints that can be expressed. For example, it can be difficult to express a constraint based on a more complex mathematical function, such as, for example, a transcendental function, because these more complex mathematical functions are not included in font-hinting language vocabularies and can be difficult to add. Lack of more complex mathematical functions (e.g., a square root function) can in turn make it difficult to determine appropriate control point locations for complying with constraints. Therefore, what would be advantageous are mechanisms for using the existing vocabulary of font-hinting languages to solve constraints even when the font-hinting languages lack more complex vocabulary.

BRIEF SUMMARY OF THE INVENTION

The foregoing problems with the prior state of the art are overcome by the principles of the present invention, which are directed towards iteratively solving constraints in a font-hinting language. A computing system accesses a more complex constraint that can not be natively expressed based on the vocabulary of the font-hinting language, the more complex constraint constraining at least a portion of the outline. The computing system decomposes the more complex constraint into a plurality of simpler constraints that can be natively expressed based on the vocabulary of the font-hinting language. The computer system represents each of the simpler constraints in corresponding font-hinting language instructions that can be iteratively processed to at least approximate a solution to the more complex constraint. The font-hinting language instructions are iteratively processed at the computing system or another computing system to cause a graphical object to comply, within a specific tolerance, with the more complex constraint.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
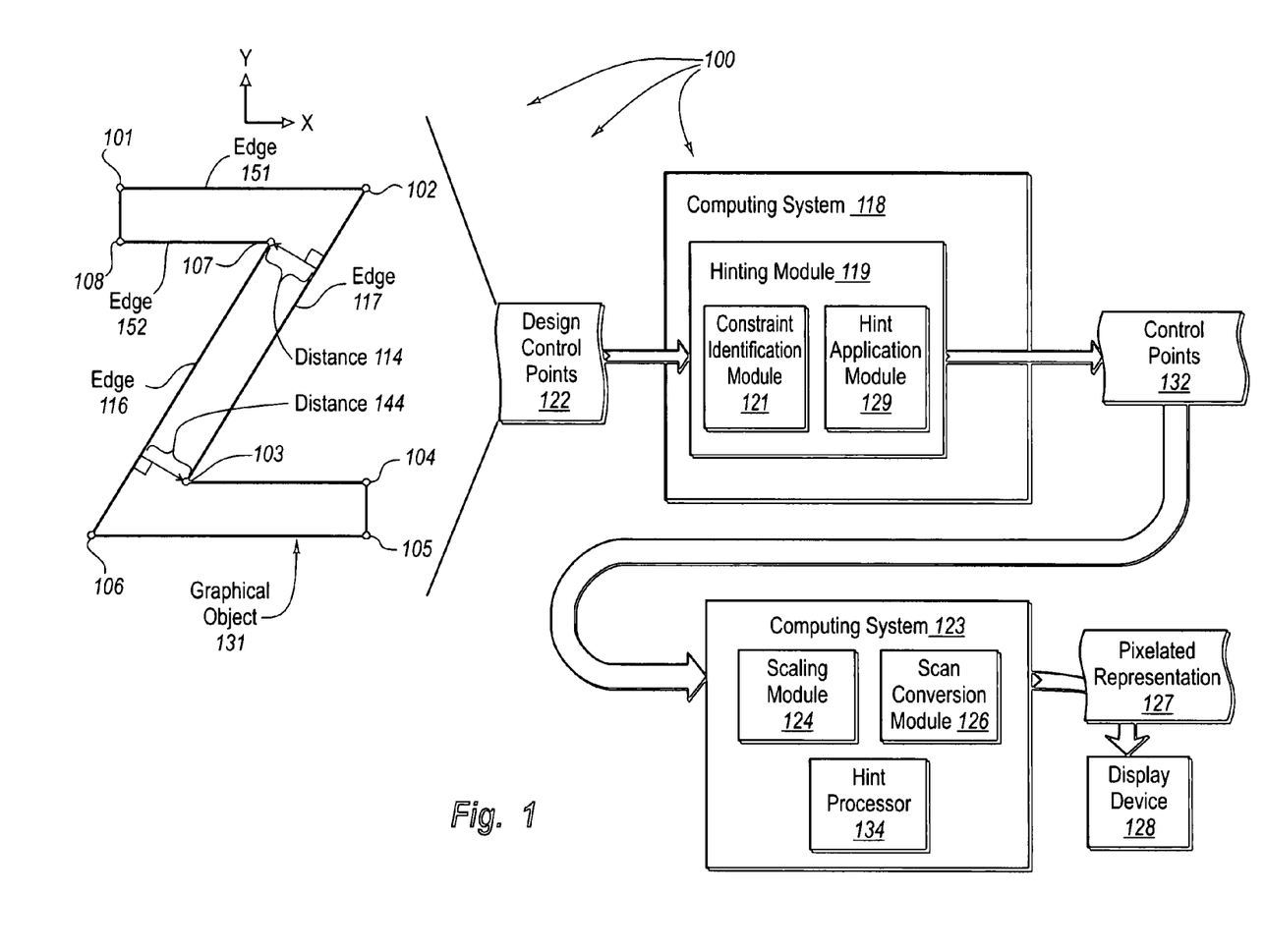
FIG. 1 illustrates an example computer architecture for iteratively solving constraints in a font-hinting language.

The principles of the present invention relate to systems, methods, and computer program products for iteratively solving constraints in a font-hinting language. A computing system receives a set of design control points describing the outline of a graphical object (e.g., a character of text) at a larger size (e.g., 72 point). The set of design control points can be unhinted or, alternately, may include basic hints for displaying the graphical object at the smaller size. The set of design control points can be associated with more complex constraints that can not be natively expressed based on the vocabulary of the font-hinting language. For example, the set of design control points can be associated with a circularly dependent constraint, such as, for example, a constraint that indicates the edges of the diagonal stroke of a "Z" are to be parallel. So for example, first and second constraints result in a circular dependency where first control points compliance with diagonal distance is dependent on second control point 103 and the second control point's compliance with diagonal distance is dependent on the first control point 107.

A computing system accesses a more complex constraint that can not be natively expressed based on the vocabulary of the font-hinting language, the more complex constraint constraining at least a portion of the outline. The computing system decomposes the more complex constraint into a plurality of simpler constraints that can be natively expressed based on the vocabulary of the font-hinting language. The computer system represents each of the simpler constraints in corresponding font-hinting language instructions that can be iteratively processed to at least approximate a solution to the more complex constraint. The font-hinting language instructions are iteratively processed at the computing system or another computing system to cause a graphical object to comply, within a specific tolerance, with the more complex constraint.

Embodiments within the scope of the present invention include computer-readable media for carrying or having computer-executable instructions or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

In this description and in the following claims, a "network" is defined as one or more data links that enable the transport of electronic data between computing systems and/or modules. When information is transferred or provided over a network or another communications connection (either hardwired, wireless, or a combination of hardwired and wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions. The computer executable instructions may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of computer architecture 100 for iteratively solving constraints in a font-hinting language. Within computer architecture 100, computing system 118 includes hinting module 119. Generally, hinting module 119 receives a set of control points (e.g., design control points 122) representing a graphical object (graphical object 131). When appropriate, hinting module 119 assigns computer-executable instructions (hereinafter referred to as "hints") of a font-hinting language (e.g., TrueType®) to control points (e.g., control points 101–108) included in the set of control points. Hints can be subsequently processed to cause a more appropriate rendering of the graphical object (e.g., at smaller sizes).

Hinting module 119 can include a number of modules that automatically identify features, such as, strokes, serifs, etc., represented by a set of control points and that automatically identify constraints on control points within the set control points. Some constraints, such as, for example, constraining a first control point to a horizontal distance from a second control point, can be more easily implemented using the existing vocabulary of font-hinting languages. However, other constraints, such as those requiring more complex mathematical functions, cannot be easily implemented (if they can be implemented at all) using the existing vocabulary of font-hinting languages. For example, when the existing vocabulary of a font-hinting language lacks a square root function, it may be difficult (or even impossible) to directly calculate distance constraints with respect to diagonal edges.

Constraint identification module 121 can identify constraints, including otherwise difficult to solve constraints, based on the position of control points or basic hints included in design control points 122. A basic hint can be a hint for rendering a graphical object at a large size (e.g., 72 point at a target device) but that is not generally applicable when rendering the graphical object at other sizes (e.g., 12 point at the target device). For example, a basic hint can constrain the width of the vertical stroke of a "T" to six pixels when rendered at 72 point at a particular target device. However, implementing the same six pixel constraint at smaller sizes has reduced meaning, since when rendered at smaller sizes at the particular target device the graphical object may not even be six pixels in width. Accordingly, hinting module 119 can generate constraint equations that base constraints on the size and resolution at which a graphical object is to be displayed. For example, hinting module 119 can configure the constraint on the vertical stroke of the "T" to be one-twelfth of the point size at which the "T" will be rendered.

The number of pixels corresponding to one-twelfth of the point size can vary depending on the resolution of the target device. On a higher resolution device, such as, for example, a 300 dots per inch ("dpi") printer, one-twelfth of the point size can correspond to a greater number of pixels. On the other hand, on a lower resolution device, such as, for example, a 96 dpi monitor, one-twelfth of the point size can correspond to a fewer number of pixels.

Hint application module 129 can add hints (e.g., TrueType® instructions) to design control points 122 to implement such a constraint when the graphical object is subsequently rendered. For example, a divide operator can be used to implement the width constraint on the vertical stroke of the "T" (stroke width=point size/12). Hint application module 129 can include hints for iteratively solving other more complex constraints, such as those requiring more complex mathematical functions. When subsequently rendering the graphical object, a computing system can process the hints to solve constraints iteratively based on, for example, the size at which the graphical object is to be displayed.

Computing system 123 includes scaling module 124, hint processor 134, and scan conversion module 126. Scaling module 124 can receive a set of hinted control points (e.g., control points 132) representing the outline of a graphical object at a larger size. Hinted control points can be received via a network connection or can be loaded from computer-readable media, such as, for example, a magnetic or optical disk. Scaling module 124 can scale the positions of the control points such that the graphical object can be rendered at a smaller or larger size.

Hint processor 134 can process hints associated with the set of hinted control points (potentially further altering positions of the scaled down control points) so that the graphical object is more appropriately rendered at the smaller size. For example, hint processor 134 can process computer-executable instructions of a font-hinting language to iteratively solve more complex constraints. Scan conversion module 126 turns pixels (or sub-pixels) of a corresponding pixel grid on or off to generate a pixelated representation of a graphical object.

Thus, hints for implementing more complex constraints can be associated with a set of control points without having to alter the font-hinting language or corresponding hint processor to include more complex mathematical functions. Accordingly, a computing system can utilize existing components to render a graphical object in a manner that complies with the more complex constraints. This is advantageous since altering the vocabulary of a font-hinting language and/or the functionality of a hint processor may be significantly more difficult and time consuming than hinting a graphical object using existing font-hinting language vocabulary.

Figure 2A:
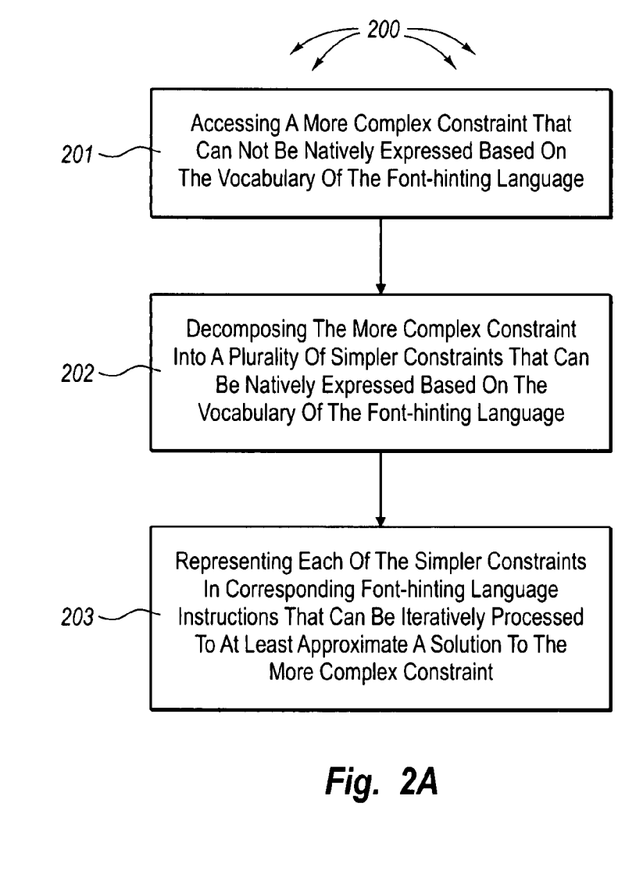
FIG. 2A illustrates a flowchart of an example method for using a font-hinting language to represent an iterative solution to a constraint.

FIG. 2A illustrates a flowchart of an example method 200 for iteratively solving constraints in a font-hinting language. The method 200 will be described with respect to the computing systems, modules, and control points in computer architecture 100. The method 200 includes an act of accessing a more complex constraint that can not be natively expressed based on the vocabulary of the font-hinting language (act 201). For example, hinting module 119 can (identify and) access a more complex constraint represented in design control points 122. A font-hinting language utilized by hinting module 119 and/or hint processor 134 may not have vocabulary for expressing more complex constraints accessed from control points 122.

A more complex constraint can be, for example, a constraint represented by a power or exponential function ($X^Y$), a plurality of circularly dependent constraints, or a constraint that requires simultaneous movement of a plurality of control points. However, this list of more complex constraints is not intended to be comprehensive. It would be apparent to one skilled in the art, after having reviewed this description, that other more complex constraints, in addition to those expressly described, can be accessed.

With respect to circularly dependent constraints, compliance with a first constraint can depend on the position of a first control point. For example, constraint identification module 121 can identify that control point 107 is constrained to diagonal distance 114 from edge 117. Compliance with diagonal distance 114 depends on the position of control point 103 since altering the position of control point 103 with respect to control point 102 will change the direction of diagonal distance 114.

Compliance with a second constraint can depend on the position of the second control point. For example, constraint identification module 121 can identify control point 103 is constrained to diagonal distance 144 from edge 116. Compliance with diagonal distance 144 depends on the position of control point 107 since altering the position of control point 107 with respect to control point 106 will change the direction of the diagonal distance 144.

Thus, the first and second constraints result in a circular dependency where control point 107's compliance with diagonal distance 114 is dependent on control point 103 and control point 103's compliance with diagonal distance 144 is dependent on control point 107. Constraint identification module 121 can identify the circular dependency.

The method 200 includes an act of decomposing the more complex constraint into a plurality of simpler constraints that can be natively expressed based on the vocabulary of the font-hinting language (act 202). For example, hinting module 119 can decompose more complex constraints accessed from design control points 122 into a plurality of simpler constraints that can be expressed in a font-hinting language utilized by hinting module 119 and/or hint processor 134.

Decomposing a more complex constraint can include any of a number of mechanisms for reducing the complexity of the more complex constraint. For example, a circularly dependent constraint can be decomposed into a plurality of non-circularly dependent constraints. A constraint based on exponential or power functions can be decomposed into a power series. A constraint requiring simultaneous movement of a plurality of control points can be decomposed in to a plurality of constraints that each corresponds to a single control point. Other more complex constraints can also be decomposed into a plurality of corresponding simpler constraints.

The method 200 includes an act of representing each of the simpler constraints in corresponding font-hinting language instructions that can be iteratively processed to at least approximate a solution to the more complex constraint (act 203). For example, hinting module 119 can represent simpler constraints in font-hinting language instructions, such as, for example, TrueType® instructions, that can be iteratively processed at hint processor 134.

With respect to circularly dependent constraints, representing simpler constraints can include formulating font-hinting language instructions for applying a first constraint, based on the current position of a first control point, to calculate a target position for a second control point. For example, hint processor 134 can formulate instructions for calculating diagonal distance 114 based on current position of control point 103 (after scaling down) to calculate a target position for control point 107. Likewise, representing simpler constraints can include formulating font-hinting language instructions for applying a second constraint, based on the current position of the second control point, to calculate a target position for the first control point. For example, hint processor 134 can formulate instructions for calculating diagonal distance 144 based on current position of control point 107 (after scaling down) to calculate a target position for control point 103.

Application of formulated instructions representing the first and second constraint can be alternated. For example, the first constraint can be applied, the second constraint can be applied, the first constraint can be applied again, the second constraint can be applied, etc. Alternate application of first and second constraints can continue until control point locations are appropriate.

Accordingly, representing simpler constraints in font-hinting language instructions can also include formulating font-hinting language instructions for determining that the target position for the second control point is within a specified tolerance of the current position for the second control point. For example, hinting module 134 formulate font-hinting language instructions for determining that the target position for control point 107 is within a specified tolerance of the current position of control point 107. A specified tolerance can be a distance in pixels or fractions of pixels (e.g., $1/64^{th}$ of a pixel). Likewise, representing simpler constraints in font-hinting language instructions can include formulating font-hinting language instructions for determining that the target position for the first control point is within the specified tolerance of the current position for the first control point. For example, hinting module 134 can formulate font-hinting language instructions for for determining that the target position for control point 103 is within a specified tolerance of the current position of control point 103.

With respect to more complex constraints based on power functions, representing simpler constraints can include formulating font-hinting language instructions for solving a power series. With respect to constraints requiring simultaneous movement of a plurality of control points, representing simpler constraints can include formulating font-hinting language instructions for moving control points individually. Representing simpler constraints corresponding to other types of more complex constraints can also include formulating appropriate font-hinting language instructions.

In some embodiments, font-hinting language instructions representing a plurality of simpler constraints are processed at the computing system that formulated the font-hinting language instructions. For example, hinting module 119 can process font-hinting language instructions (e.g., associated with control points 132) previously formulated at hinting module 119. In other embodiments, font-hinting language instructions representing a plurality of simpler constraints are transferred to another computing system for processing. For example, computing system 118 can transfer font-hinting language instructions (e.g., Me associated with control points 132) to computing system 123 for processing.

Figure 2B:
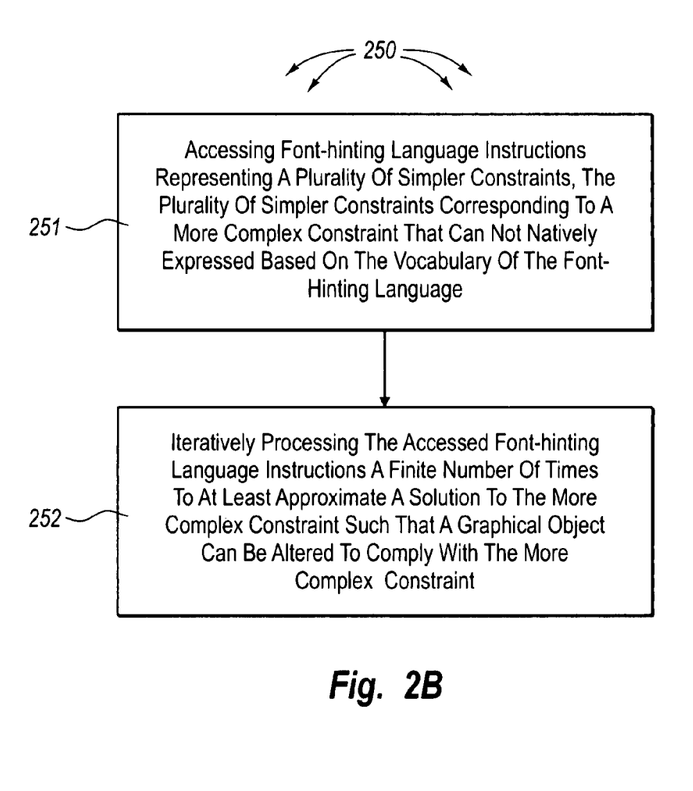
FIG. 2B illustrates a flowchart of an example method for iteratively solving constraints such that a graphical object can be appropriately rendered.

FIG. 2B illustrates a flowchart of an example method 250 for iteratively solving constraints in a font-hinting language. The method 250 will be described with respect to the computing systems, modules, and control points in computer architecture 100. The method 250 can be performed at a computing system that formulates font-hinting instructions (e.g., computing system 118) representing a plurality simpler constraints or at a computing system that receives formulated font-hinting instructions (e.g., computing system 123) representing a plurality of simpler constraints.

The method 250 includes an act of accessing font-hinting language instructions representing a plurality of simpler constraints, the plurality of simpler constraints corresponding to a more complex constraint that can not natively expressed based on the vocabulary of the font-hinting language (act 251). For example, hinting module 119 can access font-hinting language instructions (e.g., TrueType® instructions) representing a plurality of simpler constraints that correspond to a more complex constraint associated with control points 132. Similarly, hint processor 134 can access font-hinting language instructions (e.g., TrueType® instructions) representing a plurality of simpler constraints that correspond to a more complex constraint associated with control points 132.

The method 250 includes an act of iteratively processing the font-hinting language instructions a finite number of times to at least approximate a solution to the more complex constraint such that the graphical object can be altered to comply with the more complex constraint (act 252). For example, when appropriate, either hinting module 119 or hint processor 132 can iteratively process font-hinting language instructions to at least approximate a solution to the more complex constraint to at least approximate a solution to the more complex constraint.

With respect to more complex constraints that require simultaneous movement of a plurality of control points, hinting module 119 or hint processor 132 processes a plurality of font-hinting language instructions for moving individual control points (movement of an individual control point being viewed as an iteration) until all control points are moved. With respect to constraints including exponential or power functions, hinting module 119 or hint processor 132 processes a plurality of font-hinting language instructions representing portions of a power series (processing of each portion being viewed as an iteration) until each portion is processed. Based in part on the type of more complex constraint and how the complex constraint is decomposed, the processing specified portions of font-hinting language instructions representing a simpler constraint can be viewed as an iteration.

With respect to circularly dependent constraints iterations can continue until control point locations are within a threshold tolerance of complying with a constraint or a specified number of iterations is performed. For example, when the target positions for control points 103 and 107 are within the specified tolerance of corresponding current positions for control points 103 and 107 respectively, the current positions of control points 103 and 107 are viewed as sufficiently accurate. On the other hand, when either of the target positions for control points 103 and 107 is not within the specified tolerance of the corresponding current positions of control points 103 and 107 respectively, the current positions of control points 103 and 107 are viewed as not being sufficiently accurate.

When current positions are not sufficiently accurate, the current positions for control points 103 and 107 are set equal to the calculated target positions for the control points 103 and 107 respectively. The first and second constraints are applied again (using the calculated target positions as current positions) to calculate second target positions for the control points 103 and 107. That is, the calculated target positions are used to iterate second target positions. Iteratively using calculated target positions from prior calculations as current positions for new calculations can continue (e.g., using second target positions as current positions for iterating third target positions, etc.) until calculated target positions for an iteration are within the specified tolerance of current positions. Alternately, iterative calculations can continue until a threshold number of iterations have occurred. For example, a looping instruction can indicate that iteration is to stop after the tenth iteration.

The following pseudo-code represents an example of an algorithm that can be formulated and/or executed to facilitate iteratively solving constraints. In the pseudo-code example, $P_1$ can refer to the position of control point 107 and $P_2$ can refer to position of control point 106, after control points 132 have been scaled down and hinted. Similarly in the pseudo-code example, Q1 can refer to the position of control point 102 and $Q_2$ can refer to the position of control point 103, after control points 132 have been scaled down and hinted. The pseudo-code algorithm can be formulate in a variety of font-hinting languages and processed by a corresponding hint processor (e.g., hint processor 134). Within the pseudo-code example, text following a semicolon (";") represents comments that describe the functionality implemented by the pseudo-code.

| | | |
|---|---|---|
| Line 1: | n = number of iterations | ;Initialize counter |
| Line 2: | $P_1' = P_1$ | ;Remember current position of $P_1$ |
| Line 3: | $Q_2' = Q_2$ | ;Remember current position of $Q_2$ |
| Line 4: | $P_1 \leftarrow Q_1Q_2 + c$ | ;Execute constraint as if $Q_2$ were at its target position |
| Line 5: | $Q_1 \leftarrow P_2P_1 + c$ | ;Execute constraint as if $P_1$ were at its target position |
| Line 6: | n ← n − 1 | ;Decrement counter |
| Line 7: | n = 0 ? Yes, go to line 10 No, proceed | ;Have threshold number of iterations occurred? |
| Line 8: | $\|P_1 - P_1'\| < 1/64$? No, go to line 2 Yes, proceed | ;Distance between $P_1$ and $P_1'$ within tolerance? |
| Line 9: | $\|Q_2 - Q_2'\| < 1/64$? No, go to line 2 Yes, proceed | ;Distance between $Q_2$ and $Q_2'$ within tolerance ? |
| Line 10: | End | |

Within the pseudo-code example, line 4 is executed to apply a first constraint, such as, for example, diagonal distance 114 and line 5 is executed to apply a second constraint, such as, for example, diagonal distance 144. In some embodiments, the functionality represented and lines 4 and 5 is further refined.

For example, in Line 4, $P_1$ is constrained by a distance c, measured perpendicularly from edge $Q_1Q_2$. In these refined embodiments, this constraint is split into two parts. In a distance part, $P_1$ is moved to comply with the distance c. Subsequently, in a separate angle part, $Q_2$ is moved by an amount that is sufficient to re-establish the angle between edges $P_1P_2$ and $Q_1Q_2$. That is, if these edges were designed to be parallel, they will be parallel again after executing the angle part. Movement of $Q_2$ to comply with the angle part may result in additional non-compliance with the distance part. However, as more iterations are performed, the amount of additional non-compliance to the distance part introduced resulting of movement of $Q_2$ for compliance with the angle part becomes less and less significant (and after some number of iterations can become essentially irrelevant).

In Line 5, an analogous "re-parallelization" can be performed. First, $Q_1$ is moved to comply with the distance part of the constraint, then $P_1$ is moved to comply with the angle part of the constraint. These refined embodiments facilitate the constraining of available control points in such a way as to mimic constraining strokes, which can include constraining the angle between the edges of the strokes. Accordingly, these refined embodiments are advantageous for constraining strokes when available control data includes control points, along with instructions how to connect these control points (lines, Bezier curves, etc.), but does not expressly represent the strokes.

Line 7 performs a check to determine if a specified threshold number of iterations have occurred. When the specified threshold number of iterations has occurred, the algorithm terminates (even if sufficiently accurate solutions to the constraints have not been calculated). On the other hand, when the specified threshold number of iterations has not occurred, the algorithm continues to line 8.

Line 8 performs a check to determine if $P_1$ (the target position for the first control point) is within a specified tolerance ($1/64^{th}$ of a pixel) of $P_1'$ (the current position of the first control point). When the distance between $P_1$ and $P_1'$ is not within the specified tolerance, the algorithm continues at line 2 (and another iteration begins). On the other hand, when the distance between $P_1$ and $P_1'$ is within the specified tolerance the algorithm continues at line 9.

Line 9 performs a check to determine if $Q_2$ (the target position for the second control point) is within a specified tolerance ($1/64^{th}$ of a pixel) of $Q_2'$ (the current position of the second control point). When the distance between $Q_2$ and $Q_2'$ is not within the specified tolerance, the algorithm continues at line 2 (and another iteration beings). On the other hand, when the distance between $Q_2$ and $Q_2'$ is within the specified tolerance, the algorithm terminates. When both the distance between $P_1$ and $P_1'$ is within tolerance and the distance between $Q_2$ and $Q_2'$ is within the specified tolerance, $P_1$ and $Q_2$ are viewed as being sufficiently accurate for rendering a corresponding graphical object.

In some embodiments, iteratively solving constraints is used to compensate for inappropriate rendering that can occur as a result of complying with a plurality of dependent constraints. For example, when control points will have a plurality of constraints associated with them, and some of these constraints depend on other constraints, which in turn depend on other constraints, etc. it may be more difficult to appropriately render a corresponding graphical object. For example, with respect to graphical object 131, one set of constraints $C_1$ may bring edge 151 to the nearest full pixel (e.g., to a "capitalization line"). Another set of constraints $C_2$ may keep edge 152 at a specified distance from edge 151. Similar sets of constraints $C_1'$ and $C_2'$ may be associated with control points 106, 105, 103, and 104. Yet another set of constraints $C_3$ may keep edge 116 at a specified distance from edge 117. Complying with constraints of $C_1$ and $C_1'$ may have an effect on constraints of $C_2$ and $C_2'$, respectively, which in turn have an effect on constraints of $C_3$. Thus, compliance with constraints of $C_1$, $C_1'$, $C_2$ and $C_2'$ may cause control points 103 and/or 107 to no longer comply with constraints of $C_3$ (e.g., the diagonal distances 114 and 144). However, embodiments of the invention can be used to iteratively solve constraints of $C_3$ such that graphical object still complies with constraints of $C_1$, $C_1'$, $C_2$ and $C_2'$.

After control point positions are altered according to received hints, scan conversion module 126 can turn on appropriate pixels (or sub-pixels) on a pixel grid such that graphical object 131 can be rendered at the smaller size. Scan conversion module 126 can generate pixelated representation 127 that is then provided to display device 128. Display device 128 can be a color or monochrome monitor. When appropriate, for example, when display device 128 is a color monitor, scan conversion module turns on only portions of some pixels (e.g., a red, green, or blue sub-component of a pixel) to better render graphical object 131.

Figure 3:
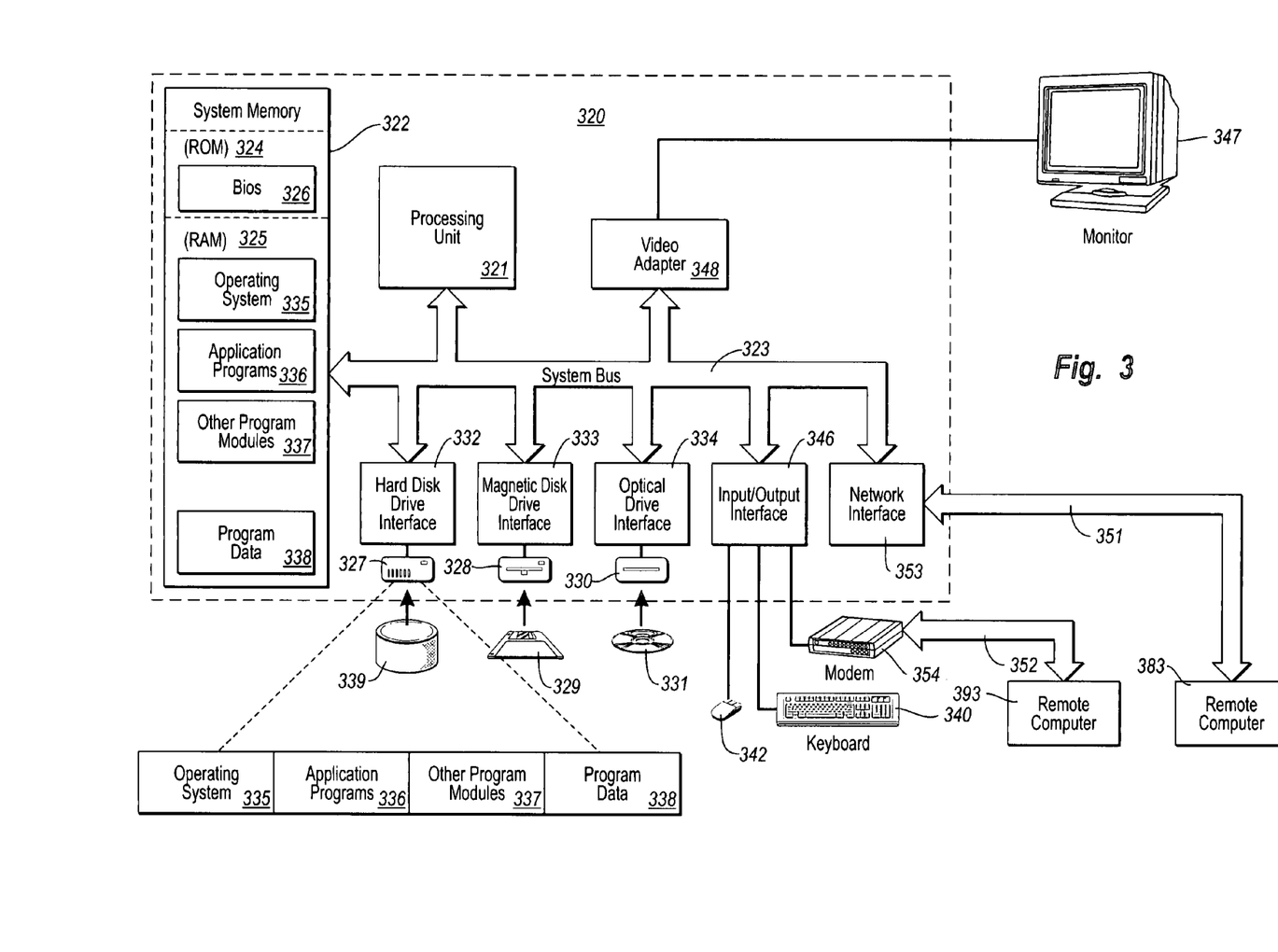
FIG. 3 illustrates a suitable operating environment for implementing the principles of the present invention.

FIG. 3 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 3, an example system for implementing the invention includes a general-purpose computing device in the form of computer system 320, including a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIOS") 326, containing the basic routines that help transfer information between elements within computer system 320, such as during start-up, may be stored in ROM 324.

The computer system 320 may also include magnetic hard disk drive 327 for reading from and writing to magnetic hard disk 339, magnetic disk drive 328 for reading from or writing to removable magnetic disk 329, and optical disk drive 330 for reading from or writing to removable optical disk 331, such as, or example, a CD-ROM or other optical media. The magnetic hard disk drive 327, magnetic disk drive 328, and optical disk drive 330 are connected to the system bus 323 by hard disk drive interface 332, magnetic disk drive-interface 333, and optical drive interface 334, respectively. The drives and their associated computer-readable media provide nonvolatile storage of computer-executable instructions, data structures, program modules, and other data for the computer system 320. Although the example environment described herein employs magnetic hard disk 339, removable magnetic disk 329 and removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 339, magnetic disk 329, optical disk 331, ROM 324 or RAM 325, including an operating system 335, one or more application programs 336, other program modules 337, and program data 338. A user may enter commands and information into computer system 320 through keyboard 340, pointing device 342, or other input devices (not shown), such as, for example, a microphone, joy stick, game pad, scanner, or the like. These and other input devices can be connected to the processing unit 321 through input/output interface 346 coupled to system bus 323. Input/output interface 346 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 347 or other display device is also connected to system bus 323 via video interface 348. Monitor 347 can display graphical objects, including text, generated by computer system 320. Other peripheral devices (not shown), such as, for example, speakers, printers, and scanners, can also be connected to computer system 320. Printers connected to computer system 347 can print graphical objects, including text, generated by computer (D t system 320.

Computer system 320 is connectable to networks, such as, for example, an office-wide or enterprise-wide computer network, a home network, an intranet, and/or the Internet. Computer system 320 can exchange data with external sources, such as, for example, remote computer systems, remote applications, and/or remote databases over such networks.

Computer system 320 includes network interface 353, through which computer system 320 receives data from external sources and/or transmits data to external sources. As depicted in FIG. 3, network interface 353 facilitates the exchange of data with remote computer system 383 via link 351. Network interface 353 can logically represent one or more software and/or hardware modules, such as, for example, a network interface card and corresponding Network Driver Interface Specification ("NDIS") stack. Link 351 represents a portion of a network (e.g., an Ethernet segment), and remote computer system 383 represents a node of the network. For example, link 351 can represent a network connection between computing systems 118 and 123.

Likewise, computer system 320 includes input/output interface 346, through which computer system 320 receives data from external sources and/or transmits data to external sources. Input/output interface 346 is coupled to modem 354 (e.g., a standard modem, a cable modem, or digital subscriber line ("DSL") modem), through which computer system 320 receives data from and/or transmits data to external sources. As depicted in FIG. 3, input/output interface 346 and modem 354 facilitate the exchange of data with remote computer system 393 via link 352. Link 352 represents a portion of a network and remote computer system 393 represents a node of the network.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

In accordance with the present invention modules, such as, for example, hinting module 119 and hint processor 134, as well as associated program data, such as, for example, design control points 122, control points 132, and pixelated representation 127, can be stored and accessed from any of the computer-readable media associated with computer system 320. For example, portions of such modules and portions of associated program data may be included in operating system 335, application programs 336, program modules 337 and/or program data 338, for storage in system memory 322.

When a mass storage device, such as, for example, magnetic hard disk 339, is coupled to computer system 320, such modules and associated program data may also be stored in the mass storage device. In a networked environment, program modules depicted relative to computer system 320, or portions thereof, can be stored in remote memory storage devices, such as, system memory and/or mass storage devices associated with remote computer system 383 and/or remote computer system 393. Execution of such modules may be performed in a distributed environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes,

What is claimed and desired secured by United States Letters Patent is:

1. In a computing system that has access to a set of control points, the set of control points for generating an outline of a graphical object, the outline being utilized to determine how the graphical object is rendered, the position of some portions of the outline potentially being constrained to pre-determined locations, a method for using a font-hinting language to represent an iterative solution to a constraint, the method comprising:

identifying features of the graphical object represented by a set of control points expressly representing strokes to identify a more complex constraint that cannot be natively expressed based on the vocabulary of the font hinting language;

accessing the more complex constraint that cannot be natively expressed based on the vocabulary of the font-hinting language, the more complex constraint constraining at least a portion of the outline;

decomposing the more complex constraint into a plurality of simpler constraints that can be natively expressed based on the vocabulary of the font-hinting languages wherein decomposing the more complex constraint into a plurality of simpler constraints comprises decomposing a circularly dependent constraint at least into:

a first constraint that constrains the position of a first control point, compliance with the first constraint depending on the position of a second control point; and a second constraint that constrains the position of the second control point, compliance with the second constraint depending on the position of the first control point; and representing each of the simpler constraints in corresponding font-hinting language instructions that are iteratively processed to at least approximate a solution to the more complex constraint; and storing the simpler constraints in one or more physical computer readable storage media that are subsequently used for displaying the graphical object according to the simpler constraints.

2. The method as recited in claim 1, wherein accessing a more complex constraint that can not be natively expressed based on the vocabulary of the font-hinting language comprises accessing a constraint that is based on a power or exponential function.

3. The method as recited in claim 1, wherein accessing a more complex constraint that can not be natively expressed based on the vocabulary of the font-hinting language comprises accessing a constraint that requires a plurality of control points to be moved simultaneously.

4. The method as recited in claim 1, wherein accessing a more complex constraint that can not be natively expressed based on the vocabulary of the font-hinting language comprises accessing circularly dependent constraints.

5. The method as recited in claim 1, further comprising identifying features of the graphical object represented by a set of control points expressly representing serifs to identify a more complex constraint that cannot be natively expressed based on the vocabulary of the font hinting language.

6. The method as recited in claim 1, wherein decomposing the more complex constraint into a plurality of simpler constraints comprises decomposing a constraint based on a power or exponential function into a plurality of portions of a power series.

7. The method as recited in claim 1, wherein decomposing the more complex constraint into a plurality of simpler constraints comprises decomposing a constraint that requires a plurality of control points to be moved simultaneously into a plurality of constraints, each constraint for moving an individual control point.

8. The method as recited in claim 1, wherein representing each of the simpler constraints in corresponding font-hinting language instructions that can be iteratively processed to at least approximate a solution to the more complex constraint comprises representing each of the simpler constraints in TrueType® instructions.

9. The method as recited in claim 1, further comprising:

iteratively processing the font-hinting language instructions a finite number of times to at least approximate a solution to the more complex constraint such that the at least a portion of the outline can be altered to comply with more complex constraint;

generating an outline of the graphical object that conforms, at least within a specified tolerance, with the more complex constraint; and generating a pixelated representation of the graphical object based on the outline, the pixelated representation for rendering at an output device.

10. In a computing system that is configured to process font-hinting language instructions, a computerized method for iteratively solving constraints such that a graphical object can be appropriately rendered, the method comprising:

receiving font-hinting language instructions representing a plurality of simpler constraints, the plurality of simpler constraints corresponding to a more complex constraint that can not be natively expressed based on the vocabulary of the font-hinting language;

iteratively processing the font-hinting language instructions a finite number of times to at least approximate a solution to the more complex constraint such that the graphical object can be altered to comply with the more complex constraint, wherein iteratively processing the font-hinting language instructions a finite number of times to at least approximate a solution to the more complex constraint comprises:

applying a first simpler constraint, based on the current position of a first control point, to calculate a target position for a second control point;

applying a second simpler second constraint, based on the current position of the second control point, to calculate a target position for the first control point;

determining that the target position for the first control point is within a specified tolerance of the current position for the first control point; and determining that the target position for the second control point is within the specified tolerance of the current position for the second control point; and displaying the graphical object according to the first and second control points.

11. The method as recited in claim 10, wherein iteratively processing the font-hinting language instructions a finite number of times to at least approximate a solution to the more complex constraint comprises iteratively processing font-hinting language instructions representing portions of a power series.

12. The method as recited in claim 10, wherein iteratively processing the font-hinting language instructions a finite number of times to at least approximate a solution to the more complex constraint comprises iteratively processing font-hinting language instructions that move individual control points.

13. The method as recited claim 10, further comprising:
    making the target position for the first control point the current position for the first control point; and
    making the target position for the second control point the current position for the second control point.

14. The method as recited in claim 10, wherein iteratively processing the font-hinting language instructions a finite number of times to at least approximate a solution to the more complex constraint comprises iteratively processing font-hinting language instructions until a specified number of iterations is performed.

15. The method as recited in claim 10, wherein iteratively processing the font-hinting language instructions a finite number of times to at least approximate a solution to the more complex constraint comprises iteratively processing font-hinting language instructions until control point locations are within a threshold tolerance of complying with a more complex constraint.

16. The method as recited in claim 10, wherein iteratively processing the font-hinting language instructions a finite number of times to at least approximate a solution to the more complex constraint comprises iteratively processing TrueType® instructions.

17. The method recited in claim 10, further comprising:
    generating an outline of the graphical object that conforms with the more complex constraint; and
    generating a pixelated representation of the graphical object based on the outline, the pixelated representation for rendering at an output device.

18. A computer program product for use in a computing system that has access to a set of control points, the set of control points for generating an outline of a graphical object, the outline being utilized to determine how the graphical object is rendered, the position of some portions of the outline potentially being constrained to pre-determined locations, the computer program product for implementing a method for using a font-hinting language to represent an iterative solution to a constraint, the computer program product comprising computer-executable instructions on a physical computer readable storage medium that, when executed by a processor, cause the computing system to perform the following:
    identify features of the graphical object represented by a set of control points expressly representing strokes to identify a more complex constraint that cannot be natively expressed based on the vocabulary of the font hinting language;
    access the more complex constraint that cannot be natively expressed based on the vocabulary of the font-hinting language, the more complex constraint constraining at least a portion of the outline;
    decompose the more complex constraint into a plurality of simpler constraints that can be natively expressed based on the vocabulary of the font-hinting, wherein decomposing the more complex constraint into a plurality of simpler constraints comprises decomposing a circularly dependent constraint at least into:
        a first constraint that constrains the position of a first control point, compliance with the first constraint depending on the position of a second control point; and
        a second constraint that constrains the position of the second control point, compliance with the second constraint depending on the position of the first control point; and
    represent each of the simpler constraints in corresponding font-hinting language instructions that are iteratively processed to at least approximate a solution to the more complex constraint.

* * * * *